United States Patent
Yang et al.

(10) Patent No.: US 7,303,324 B2
(45) Date of Patent: Dec. 4, 2007

(54) BACKLIGHT MODULE

(75) Inventors: Xing-Peng Yang, Beijing (CN); Ying-Bai Yan, Beijing (CN); Guo-Fan Jin, Beijing (CN)

(73) Assignees: Tsing Hua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/432,744

(22) Filed: May 10, 2006

(65) Prior Publication Data

US 2006/0256578 A1    Nov. 16, 2006

(30) Foreign Application Priority Data

May 13, 2005    (CN)    ......... 2005 1 0034654

(51) Int. Cl.
*F21V 7/04* (2006.01)

(52) U.S. Cl. ............ 362/609; 362/612; 362/613

(58) Field of Classification Search ......... 362/608, 362/609, 610, 611, 612, 613, 614, 621, 623, 362/626; 349/65
See application file for complete search history.

(56) References Cited

U.S. PATENT DOCUMENTS

| 7,033,062 | B2* | 4/2006 | Lee et al. ........... 362/613 |
| 7,134,777 | B2* | 11/2006 | Sung .................. 362/621 |
| 2003/0214818 | A1 | 11/2003 | Ehara et al. |
| 2004/0184258 | A1 | 9/2004 | Sung |
| 2006/0002141 | A1* | 1/2006 | Ouderkirk et al. ......... 362/609 |

FOREIGN PATENT DOCUMENTS

CN    1609682 A    4/2005

* cited by examiner

*Primary Examiner*—Y. My Quach-Lee
(74) *Attorney, Agent, or Firm*—Jeffrey T. Knapp (57) ABSTRACT

A backlight module includes a light guide plate, a light source, and a reflector. The light guide plate includes an incident surface and a corner adjacent the incident surface. The light source is disposed adjacent the incident surface and the corner of the light guide plate. The light source has an emitting surface. The reflector is disposed substantially facing the incident surface. The reflector has a curved reflective surface facing the emitting surface, the surface being shaped and positioned for uniformly reflecting light beams emitted from the light source into the light guide plate through the incident surface. An angle of inclination of the emitting surface with respect to the incident surface is chosen to be in the range from above about 0 to about 180 degrees. The backlight module can effectively eliminate shadow formation adjacent the incident surface of the light guide plate.

3 Claims, 7 Drawing Sheets

BACKLIGHT MODULE

BACKGROUND OF THE INVENTION

1. Field of the Invention

The present invention relates to a backlight module and, particularly, to an edge-lighting type backlight module for use in, for example, a liquid crystal display (LCD).

2. Discussion of the Related Art

In a liquid crystal display device, liquid crystal is a substance that does not itself radiate light. Instead, the liquid crystal relies on receiving light from a light source to thereby display images and data. In the case of a typical liquid crystal display device, a backlight module powered by electricity supplies the needed light.

Figure 8:
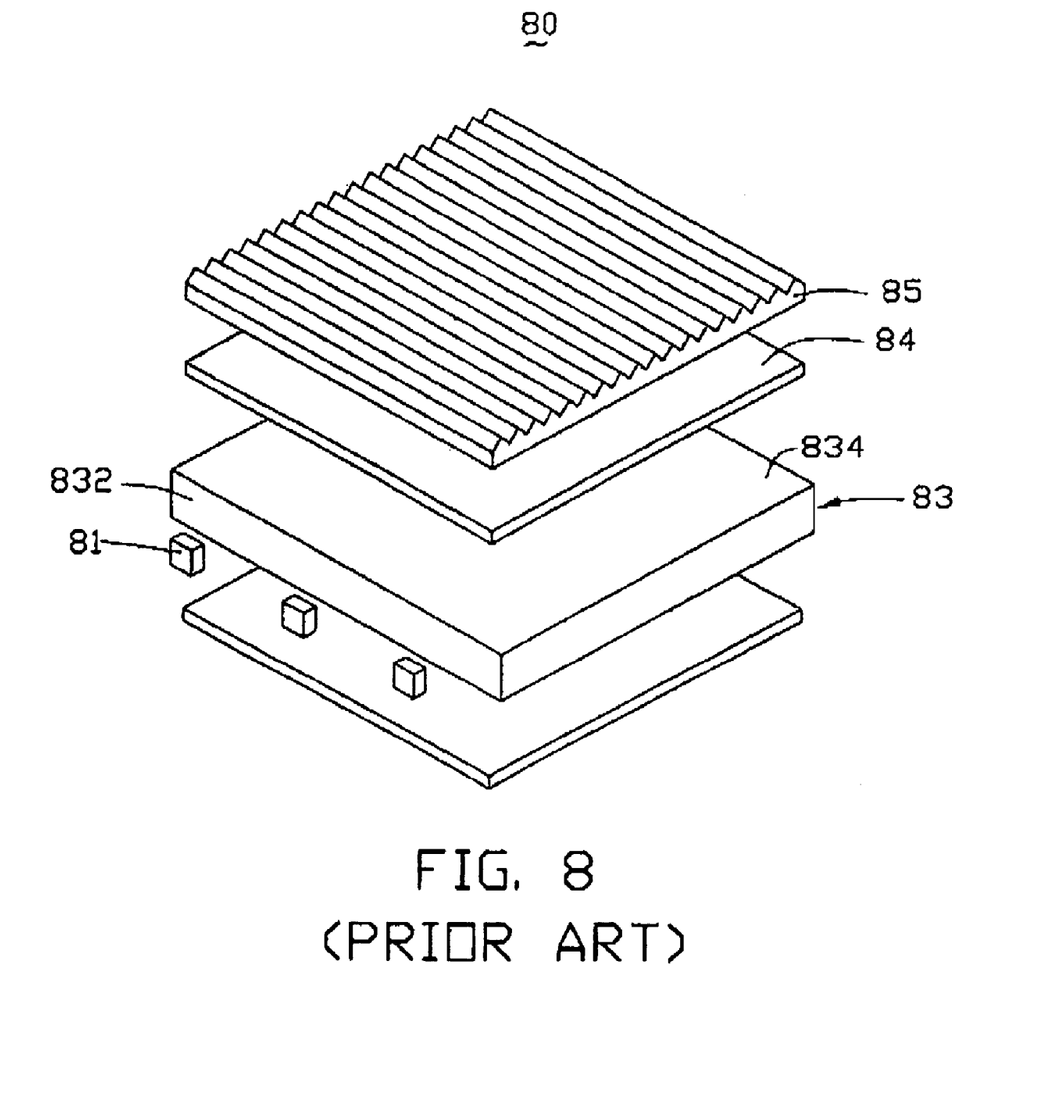
FIG. 8 is a schematic, isometric view of a conventional backlight module.

FIG. 8 (Prior art) represents a conventional edge-lighting type backlight module 80. The backlight module 80 includes a plurality of light emitting diodes (LEDs) 81, a light guide plate 83, a diffusion sheet 84, and a prism sheet 85. The light guide plate 83 includes an incident surface 832 and an emitting surface 834 adjacent the incident surface 832. The LEDs 81 are positioned adjacent the incident surface 832 of the light guide plate 83. The diffusion sheet 84 is located above the light guide plate 83 and is configured for uniformly diffusing the emitted light. The prism sheet 85 is positioned above the diffusion sheet 84 and is configured for collimating the emitted light, thereby improving the brightness of light illumination. However, a plurality of dark areas are generally unavoidably formed adjacent the incident surface 832.

Figure 9:
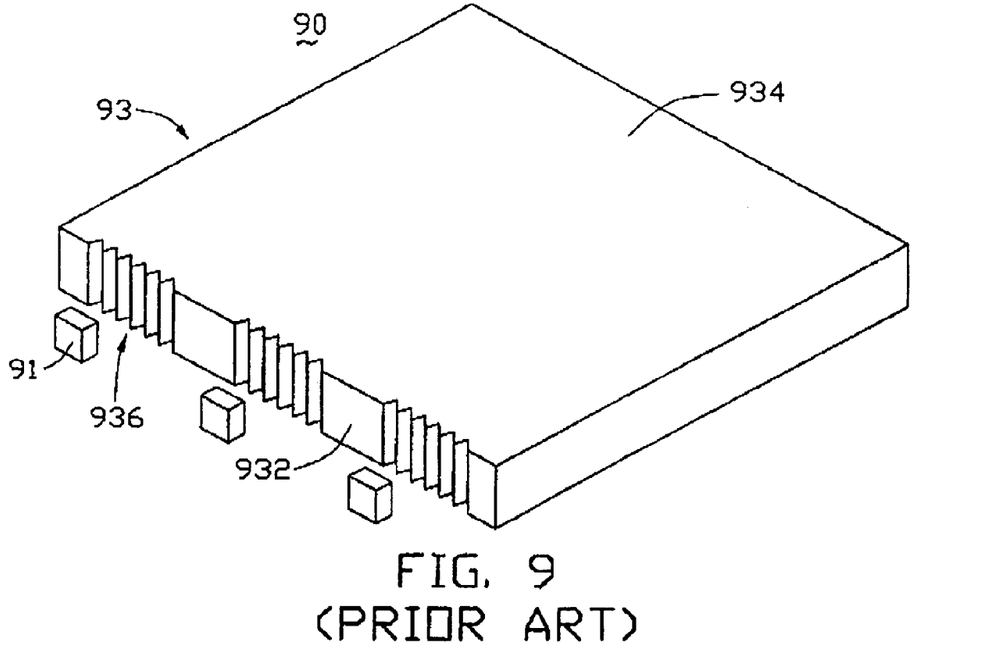
FIG. 9 is a schematic, isometric view of another conventional backlight module.

Referring to FIG. 9, another conventional backlight module 90 is shown. The backlight module 90 includes a plurality of LEDs 91 and a light guide plate 93. The light guide plate 93 includes an incident surface 932 facing the LEDs 91, an emitting surface 934 adjoining the incident surface 932, and a plurality of light diffusing portions 936 defined in the incident surface 932, spatially corresponding to the LEDs 91. The light diffusing portions 936 has a plurality of V-shaped grooves arranged regularly and periodically in a direction perpendicular to the emitting surface. Light beams incident on the light diffusing portions 936 are scattered. The diffusing portions 936 can thereby reduce the area of dark areas formed adjacent the incident surface 932.

Figure 10:
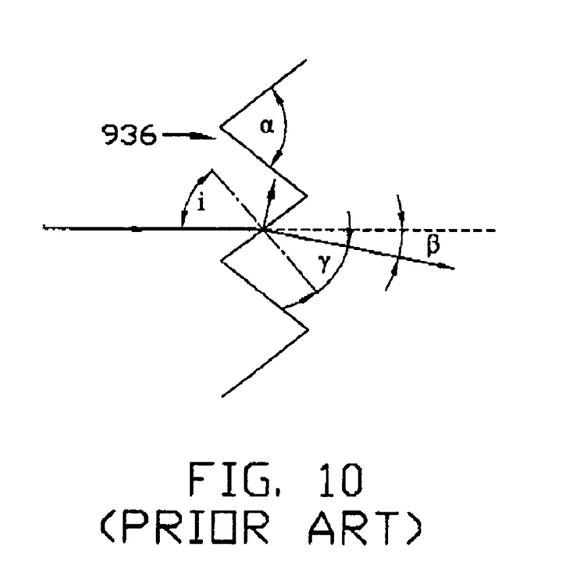
FIG. 10 is an enlarged view showing part of light diffusing portions of the backlight module of FIG. 9 and a light path associated therewith.

FIG. 10 shows that a light beam is refracted into the light guide plate 93 through the incident surface 932 having a plurality of diffusing portion 936 of FIG. 9. According to the Fresnel formula of reflection and deflection, a deflection angle β can be defined by the following equation:

$$\beta = 90 - \alpha/2 - \arcsin\left(\frac{\sin(90-\alpha/2)}{n}\right),$$

wherein α is the vertex angle of V-shaped grooves of the diffusing portion 936, and n is a refractive index of the light guide plate 90. The deflection angle β cannot be greater than or even equal to 90 degrees, according to the equation. For example, if the light guide plate 90 is formed of polymethyl methacrylate (PMMA), the largest deflection angle β is generally smaller than 50 degrees. Therefore, the diffusing portions 936 cannot eliminate dark areas formed adjacent the incident surface 932 completely. In addition, a part of light beams can be reflected at the incident surface 932 of the light guide plate 93, thus a utilization efficiency of light energy of the backlight module 90 is decreased.

Figure 11:
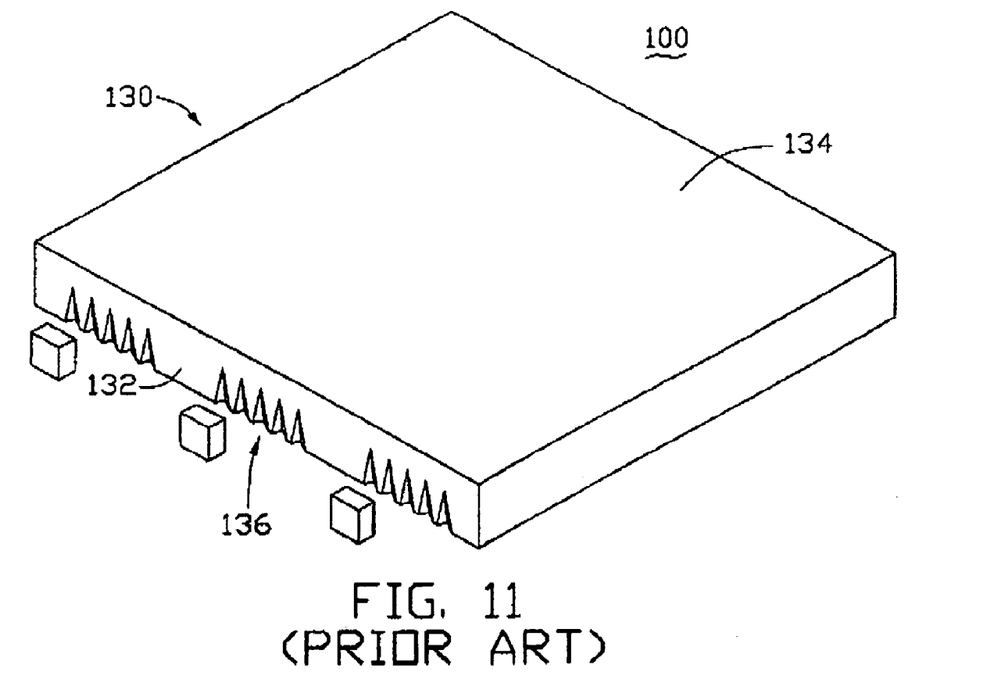
FIG. 11 is a schematic, isometric view of a still another conventional backlight module.

Referring to FIG. 11, a still another conventional backlight module 100 is shown. The backlight module 100 is similar to the backlight module 90, except that the light diffusing portions 136 are different from the diffusing portion 936 of the backlight module 90. The backlight module 100 includes a light guide plate 130 having an incident surface 132, an emitting surface 134, and a plurality of light diffusing portions 136. The light diffusing portions 136 are, particularly, a plurality of grooves defined in the incident surface 132. The diffusing portions 136 can also reduce the area of the dark areas formed adjacent the incident surface 132.

Figure 12:
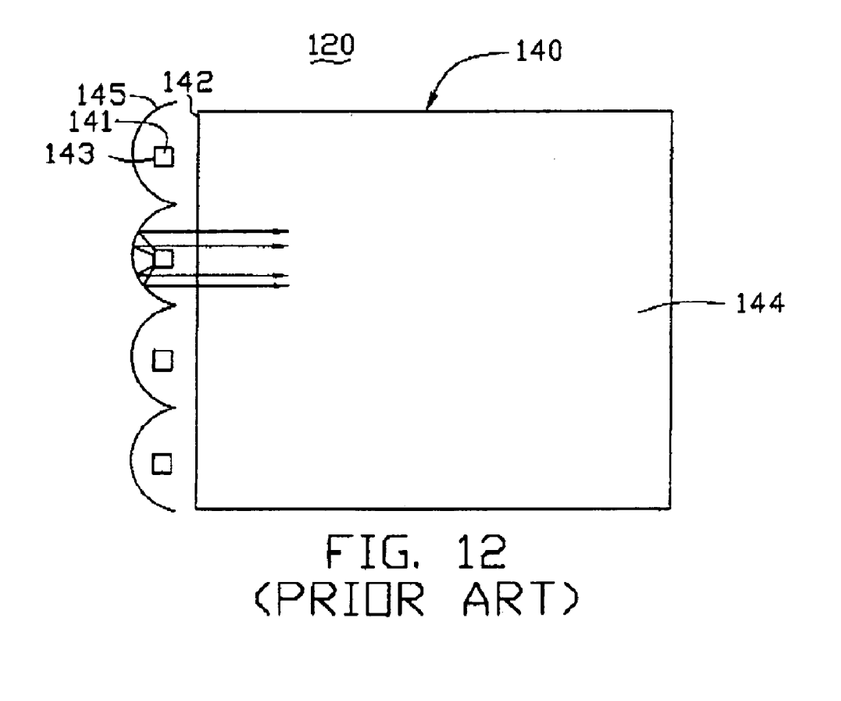
FIG. 12 is a schematic, top view of a yet another conventional backlight module.

Referring to FIG. 12, a yet another conventional backlight module 120 is shown. The backlight module 120 includes a plurality of LEDs 141, a light guide plate 140, and a reflector 145. The light guide plate 140 includes an incident surface 142, which faces the LEDs 141, and an emitting surface 144 adjoining the incident surface 142. The reflector 145 has a plurality of curved sections, each partly surrounding the respective LED 141. Each of the LEDs 141 has a luminescent surface 143 that faces the adjacent curved section of the reflector 145. Light beams, emitted from the LEDs 141, are redirected by the reflector 145 and enter into the light guide plate 140 through the incident surface 142 thereof. However, part of the light beams are blocked by the respective LEDs 141, thereby preventing that part of the light beams from reaching the incident surface 142 adjacent to the respective LEDs 141. As a result, a plurality of dark areas is formed in the light guide plate 140, adjacent the incident surface 142.

What is needed, therefore, is a backlight module which can completely eliminate the dark areas formed adjacent the incident surface of the light guide plate.

SUMMARY

A backlight module according to a preferred embodiment includes a light guide plate, a light source, and a reflector. The light guide plate includes an incident surface and a corner adjacent the incident surface. The light source is disposed adjacent the incident surface and the corner of the light guide plate. The light source has an emitting surface. The reflector is disposed substantially facing the incident surface. The reflector has a curved reflective surface facing the emitting surface that is shaped and positioned (i.e., configured) for uniformly reflecting light beams emitted from the light source into the light guide plate through the incident surface. An angle of inclination of the emitting surface with respect to the incident surface is chosen to be in the range from above about 0 to about 180 degrees. The chosen angle of inclination acts as a factor in the choice for the shape and position of the curved reflective surface.

Compared with conventional backlight modules, a preferred backlight module of the present design has a light source disposed adjacent to the corner of the incident surface of the light guide plate and a reflector disposed adjacent to the light source and substantially covering (i.e., extending the width of) the incident surface. Light beams emitted from the light source are all reflected by the reflector and enter into the light guide plate through the incident surface. There are no light beams that are blocked by the LEDs. Therefore, the dark areas can be effectively eliminated. Therefore, the backlight module has a highly uniform brightness.

Other advantages and novel features will become more apparent from the following detailed description of the preferred embodiments, when taken in conjunction with the accompanying drawings.

BRIEF DESCRIPTION OF THE DRAWINGS

Many aspects of the backlight module can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module, in detail.

Figure 1:
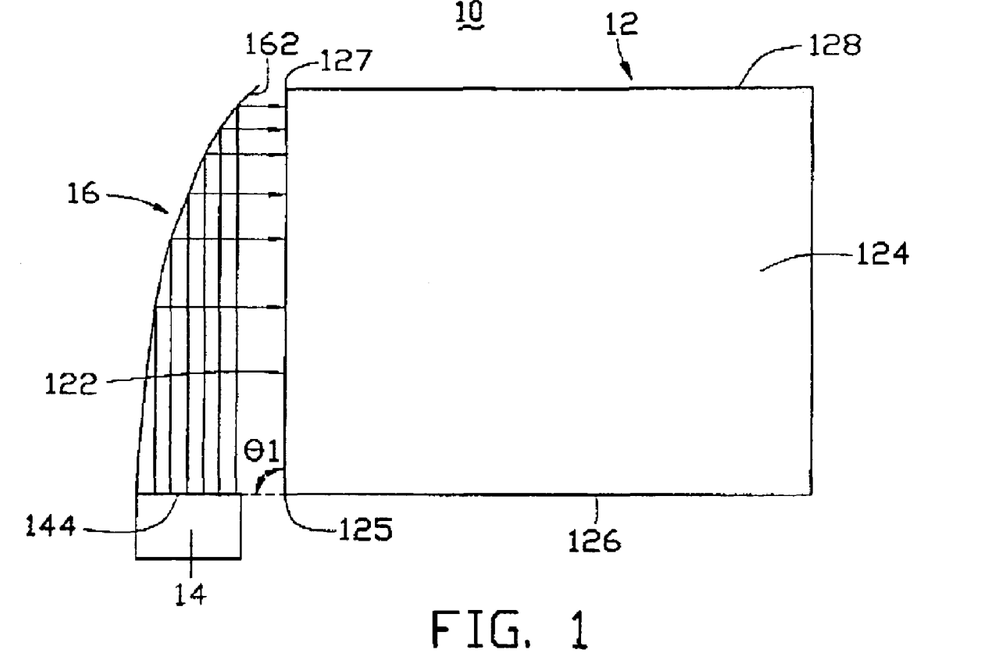
FIG. 1 is a schematic, top view of a backlight module, according to a first preferred embodiment.

Referring to FIG. 1, a backlight module 10 in accordance with a first preferred embodiment is shown. The backlight module 10 includes a light guide plate 12, a light emitting diode (LED) 14, and a reflector 16. The light guide plate 12 is generally a flat sheet having a substantially rectangular shape in plan view. The light guide plate 12 includes an incident surface 122, an emitting surface 124, and two main opposite side surfaces 126, 128. The incident surface 122 interconnects the two main opposite side surface 126, 128. The incident surface 122 and the main opposite side surface 126, 128 cooperatively form two corners 125, 127. The emitting surface 124 is the top surface of the light guide plate 12. The LED 14 is disposed adjacent the corner 125. The LED 14 has a LED emitting surface 144. An angle of inclination θ1 exists between the LED emitting surface 144 and the incident surface 122. In the illustrated embodiment, the LED emitting surface 144 is substantially perpendicular to the incident surface 122 of the light guide plate 12. Therefore the angle θ1 is about 90 degrees.

The reflector 16 is disposed adjacent the incident surface 122 and the LED 14. The reflector 16 extends from the emitting surface 144 of the LED 14 to the corner 127, opposite the LED 14. The reflector 16 has a curved reflective surface 162, which faces the emitting surface 144, and is configured (i.e., structured and arranged) for uniformly reflecting light beams emitted from the LED 14 into the light guide plate 12 through the incident surface 122.

Figure 2:
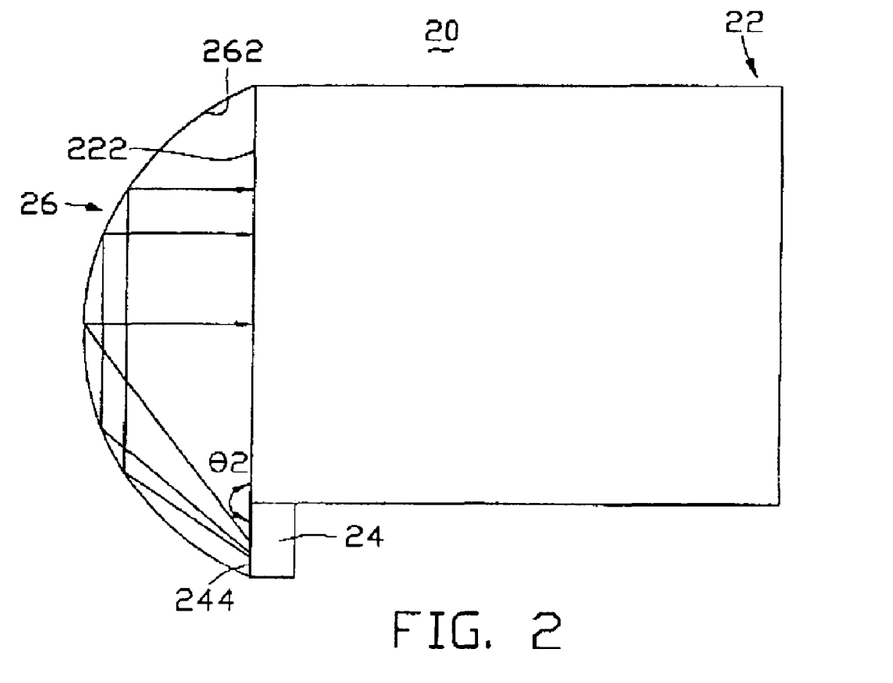
FIG. 2 is a schematic, top view of a backlight module, according to a second preferred embodiment.

Referring to FIG. 2, a backlight module 20 in accordance with a second preferred embodiment is shown. The backlight module 20 includes a light guide plate 22 having an incident surface 222, a LED 24, and a reflector 26. The LED 24 has an emitting surface 244, and the reflector 26 has a reflective surface 262. The backlight module 20 is similar to the backlight module 10, except that an angle of inclination θ2 of the emitting surface 244 with respect to the incident surface 222 is different. The angle θ2 is about 180 degrees. In the illustrated embodiment, in order to cause light beams emitted from the LED 24 to be uniformly reflected into the light guide plate 22, a curvature of the reflective surface 262 of the reflector 26 should be chosen according to the configuration/positioning of the LED 24, accordingly. That is, the curved (advantageously, parabolic) shape of the reflector 16, 26 should be chosen so as to reflect any light beams incident thereupon so as to be essentially orthogonal to the respective incident surface 122, 222. Therefore, the curvature of the reflective surface 262 of the reflector 26 is also different from that of the reflector 16.

Figure 3:
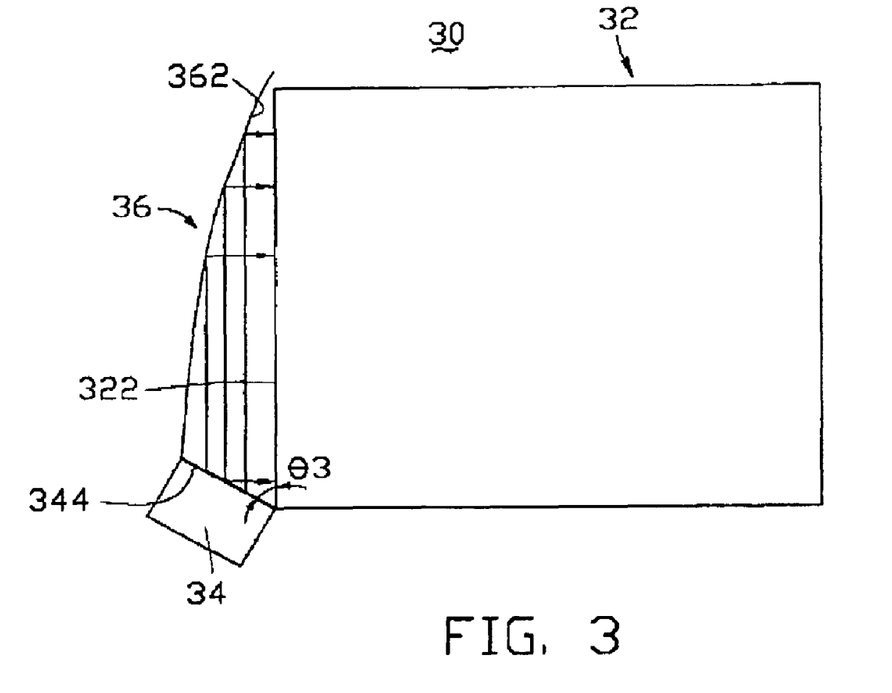
FIG. 3 is a schematic, top view of a backlight module, according to a third preferred embodiment.

Referring to FIG. 3, a backlight module 30 in accordance with a third preferred embodiment is shown. The backlight module 30 includes a light guide plate 32 having an incident surface 322, a LED 34, and a reflector 36. The LED 34 has an emitting surface 344, and the reflector 36 has a reflective surface 362. The backlight module 30 is similar to the backlight module 10, except that an angle of inclination θ3 of the emitting surface 344 with respect to the incident surface 322 is different. The angle θ3 is chosen to be about 60 degrees. A curvature of the reflective surface 362 is configured according to the arrangement of the LED 34, thereby reflecting light beams emitted from the LED 34 uniformly into the light guide plate 32.

Figure 4:
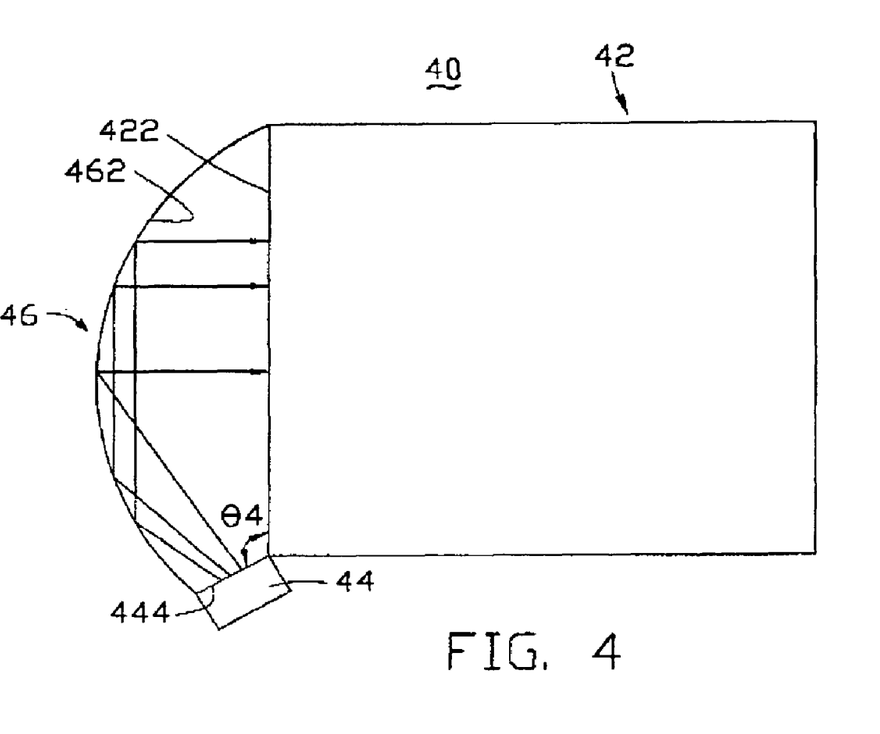
FIG. 4 is a schematic, top view of a backlight module, according to a fourth preferred embodiment.

Referring to FIG. 4, a backlight module 40 in accordance with a fourth preferred embodiment is shown. The backlight module 40 includes a light guide plate 42 having an incident surface 422, a LED 44, and a reflector 46. The LED 44 has an emitting surface 444, and the reflector 46 has a reflective surface 462. The backlight module 40 is similar to the backlight module 10. However, the angle of inclination θ4 of the emitting surface 444 with respect to the incident surface 422 is different. The angle θ4 is advantageously about 120 degrees. A curvature of the reflective surface 462 is chosen based upon the positioning of the LED 44, thereby reflecting light beams emitted from the LED 44 uniformly into the light guide plate 42.

It is noted that, the angle of inclination of the emitting surface with respect to the incident surface of the light guide plate is not limited to the above illustrated embodiments. An angle in the range from above about 0 to about 180 degrees should be considered to be within the scope of the present invention. Because the light source is disposed adjacent the corner bounded by the incident surface and the main side opposite surfaces of the light guide plate, light beams emitted from the light source are all reflected by the reflector and enter into the light guide plate through the incident surface. There are no light beams that are blocked by the LEDs. Therefore, the dark areas can be effectively, if not absolutely entirely, eliminated. Therefore, the backlight module has a highly uniform brightness.

Figure 5:
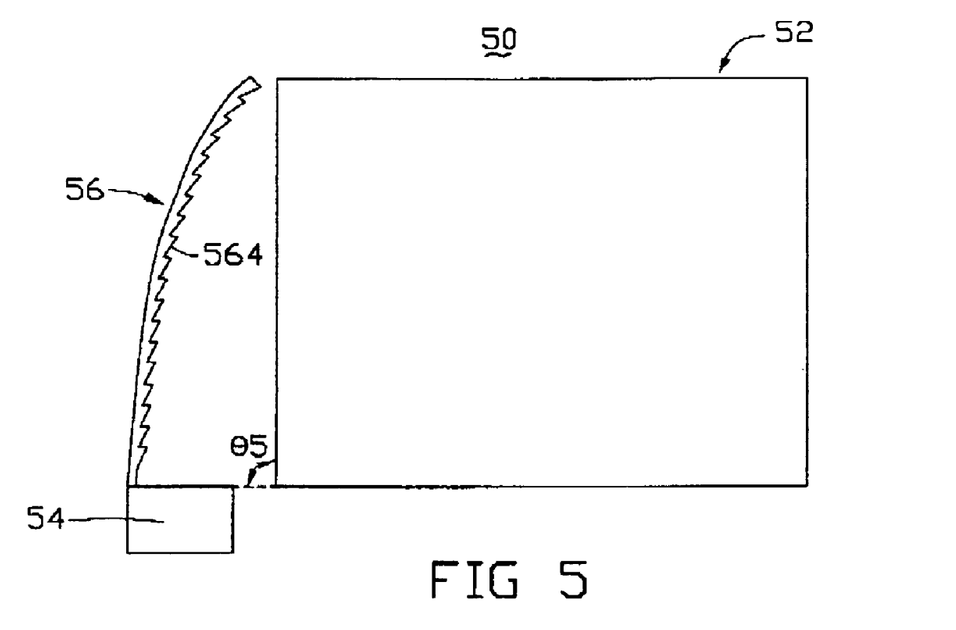
FIG. 5 is a schematic, top view of a backlight module, according to a fifth preferred embodiment.

Referring to FIG. 5, a backlight module 50, in accordance with a fifth preferred embodiment, is shown. The backlight module 50 is similar to the backlight module 10. However, a reflector 56 is different. The backlight module 50 further includes a plurality of microstructures 564 formed on the reflective surface of the reflector 56. A distribution density and size of the microstructures 564 are particularly provided so as to improve the light brightness uniformity of the light guide plate 52. The microstructures 564 may be, e.g., V-shaped projections, V-shaped grooves, or reflective dots. In the illustrated embodiment, the microstructures 564 are V-shaped projections.

Figure 6:
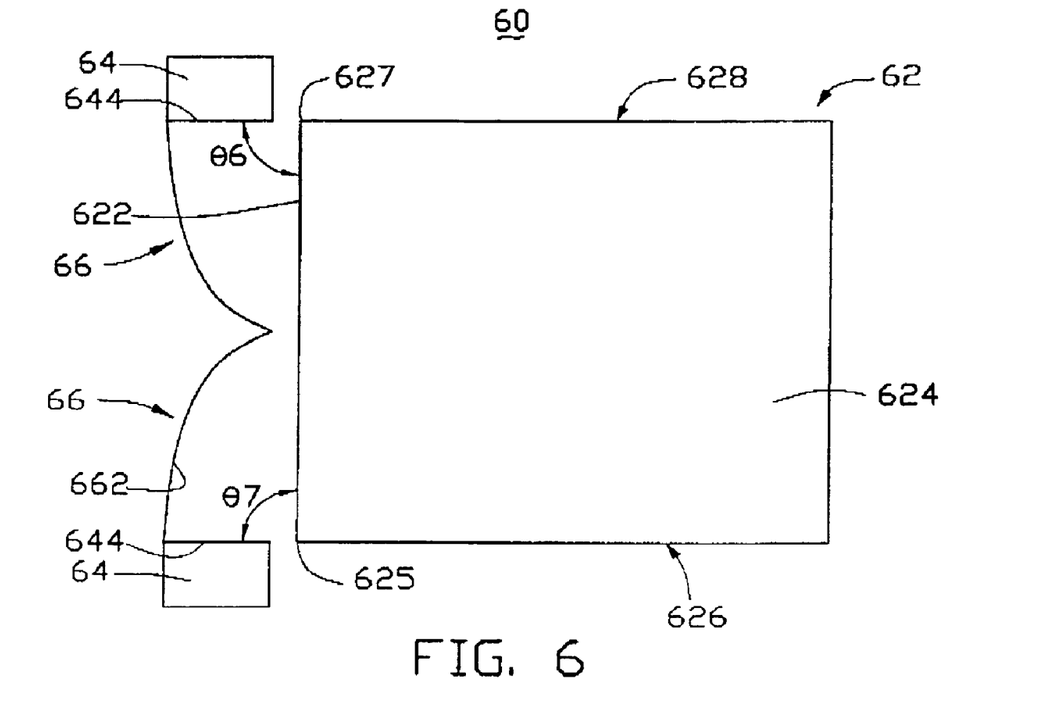
FIG. 6 is a schematic, top view of a backlight module, according to a sixth preferred embodiment.

Referring to FIG. 6, a backlight module 60, in accordance with a sixth preferred embodiment, is available and is an extension of the layout associated with the backlight module 10. The backlight module 60 includes a light guide plate 62, two LEDs 64, and two reflectors 66. The light guide plate 62 includes an incident surface 622, an emitting surface 624 adjoining the incident surface 622, and two main opposite side surfaces 626, 628. The incident surface 622 interconnects the two main opposite side surfaces 626, 628. The incident surface 622 and the two main opposite side surface 626, 628 cooperatively form two corners 625, 627. The LEDs 64 are symmetrically disposed adjacent the respective corners 625, 627, with respect to a middle line (not shown) of the incident surface 622. Each of the LEDs 64 has an emitting surface 644. Two angles of inclination of the two emitting surfaces 644 with respect to the incident surface 622 are indicated with θ6 and θ7, respectively. In the illustrated embodiment, each of the two emitting surfaces 644 is substantially perpendicular to the incident surface 622 of the light guide plate 62. The angles θ6, θ7 are therefore about 90 degrees.

The two reflectors 66 are respectively disposed adjacent to the incident surface 622 and to a respective LED 64. Each of the two reflectors 66 has a reflective surface 662. One end of the reflective surface 662 abuts against the emitting surface 644 of the adjacent LED 64. The other end of the reflective surface 662 extends to and abuts against a middle of the incident surface 622 of the light guide plate 62. Each of the two reflective surfaces 622 faces the respective emitting surface 644. The two reflectors 66 together cover (i.e., extend over) the incident surface 622 completely. Accordingly, light beams emitted from the LEDs 64 can be uniformly reflected into the light guide plate 62 through the incident surface 622 by the reflectors 66.

Figure 7:
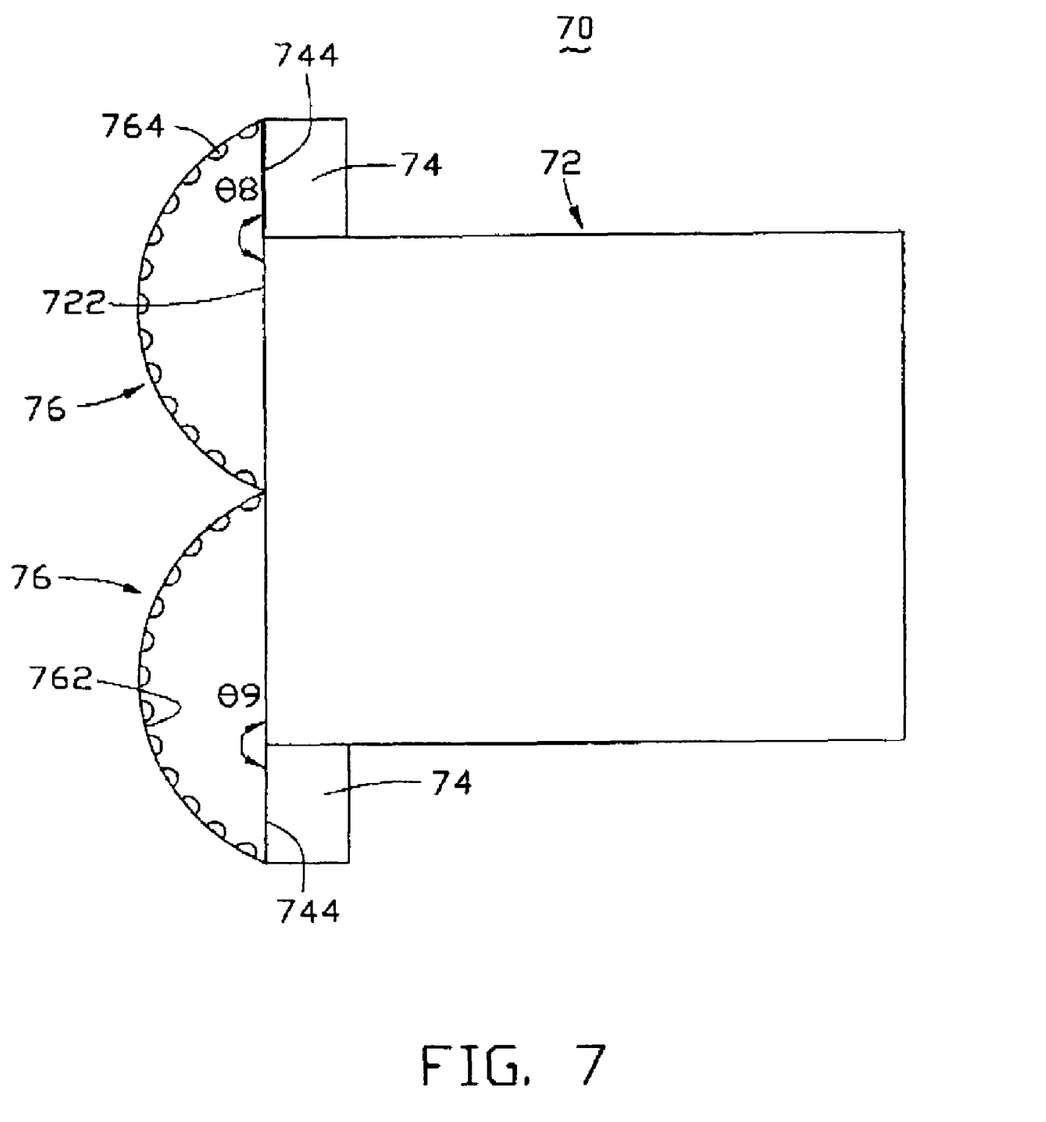
FIG. 7 is a schematic, top view of a backlight module, according to a seventh preferred embodiment.

Referring to FIG. 7, a backlight module 70 in accordance with a seventh preferred embodiment is shown. The backlight module 70 includes a light guide plate 72 having an incident surface 722, two LEDs 74, and two reflectors 76. The backlight module 70 further includes a plurality of microstructures 764 formed on the reflective surface of each reflector 76. In the illustrated embodiment, the microstructures 764 are reflective dots. Each LED 74 has an emitting surface 744. Each reflector 76 has a reflective surface 762. The backlight module 70 is similar to the backlight module 60 and is an extension of the concept offered by the backlight module 20. However the angle θ8, θ9 defined by the two emitting surfaces 744 and the incident surface 722 is different. A curvature of each reflective surface 762 is chosen according to the positioning of the respective LED 74, in order to reflect the light beams emitted from the LEDs 74 uniformly into the light guide plate 72. The angles θ8, θ9 are thus picked to be about 180 degrees.

It is noted that the angle of inclination of the emitting surfaces of the two LEDs relative to the incident surface of the light guide plate is not limited to 180 degrees of the illustrated embodiment. The angle of inclination in the range from above about 0 to about 180 degrees should be considered to be within the scope of the present invention. The two LEDs can also be asymmetrically disposed adjacent the respective corners with respect to a middle line of the incident surface of the light guide plate. In the illustrated exemplary embodiment, the backlight module includes two reflectors. The two reflectors can be asymmetrically or symmetrically disposed adjacent the incident surface with respect to the middle line of the incident surface according to the configuration/positioning/arrangement of the respective LEDs.

The overall shape of the light guide plate may be configured to be flat or wedge-shaped. The light guide plate beneficially is made of a material selected from polymethyl methacrylate (PMMA), polycarbonate (PC), and other suitable transparent resin materials.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A backlight module comprising:
   a light guide plate having an incident surface, a first corner and a second corner, the two corners adjacent to the incident surface;
   a first light source and a second light source, each of the two light sources having an emitting surface, the two light sources being respectively symmetrically disposed adjacent to the two corners of the light guide plate with respect to a middle line of the incident surface; and
   a first reflector and a second reflector, each of the two reflectors being adjacent to a corresponding light source, the two reflectors being respectively symmetrically disposed adjacent to the incident surface with respect to a middle line of the incident surface, each of the two reflectors having a curved reflective surface facing the emitting surface, the two reflectors being configured for uniformly reflecting light beams emitted from the light sources into the light guide plate through the incident surface;
   wherein a plurality of microstructures formed on the reflective surfaces of the first reflector and the second reflector, and an angle of inclination of the emitting surface with respect to the incident surface is chosen to be in the range from above about 0 to about 180 degrees.

2. The backlight module according to claim 1, wherein the microstructures are selected from a group consisting of V-shaped projections, V-shaped grooves, and reflective dots.

3. The backlight module according to claim 1, wherein the light source is a light emitting diode.

* * * * *